No. 702,980. Patented June 24, 1902.
H. P. MAXIM.
STEERING MECHANISM FOR VEHICLES.
(Application filed Oct. 20, 1899.)
(No Model.)
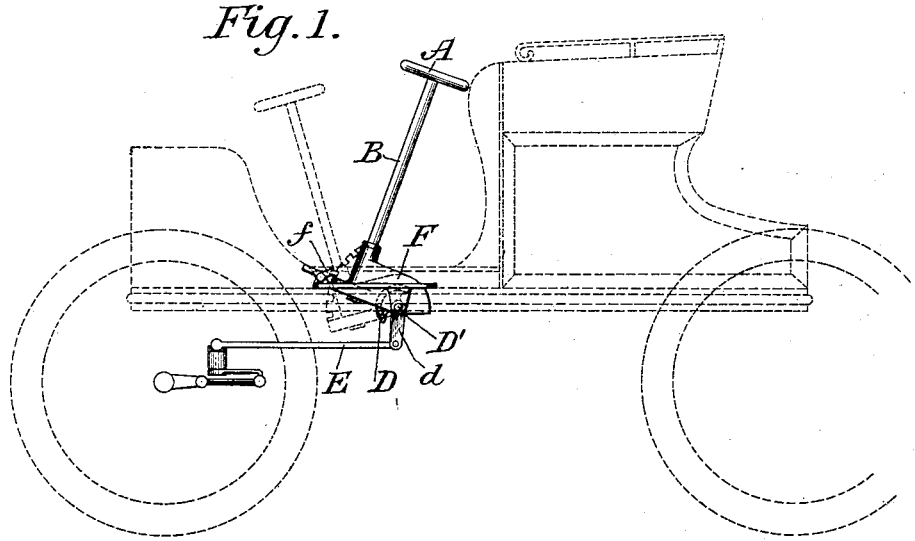
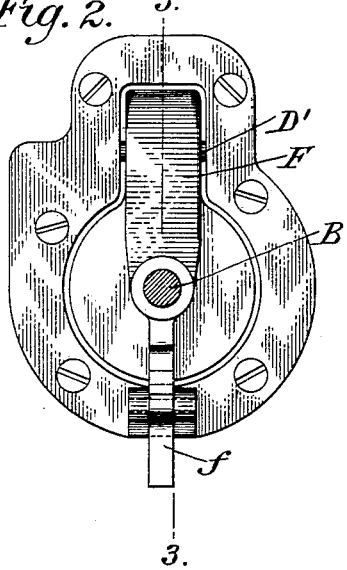
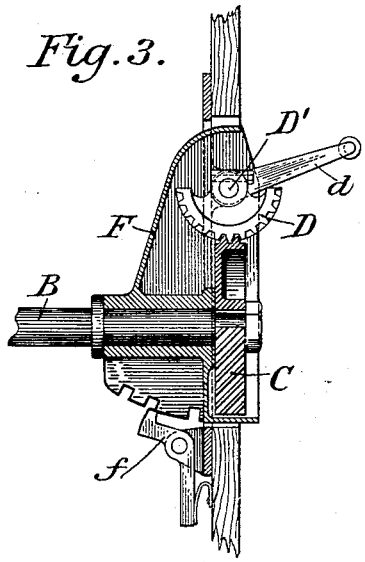
Attest:
A. N. Jesbera
L. R. Moore
Inventor:
Hiram Percy Maxim
by Redding, Kiddle & Greeley
Attys.

UNITED STATES PATENT OFFICE.

HIRAM PERCY MAXIM, OF HARTFORD, CONNECTICUT, ASSIGNOR, BY MESNE ASSIGNMENTS, TO MORTON TRUST COMPANY, TRUSTEE, A CORPORATION OF NEW YORK.

STEERING MECHANISM FOR VEHICLES.

SPECIFICATION forming part of Letters Patent No. 702,980, dated June 24, 1902.

Application filed October 20, 1899. Serial No. 734,153. (No model.)

*To all whom it may concern:*

Be it known that I, HIRAM PERCY MAXIM, a citizen of the United States, residing in Hartford, county of Hartford, State of Connecticut, have invented certain new and useful Improvements in Steering Mechanism for Motor-Vehicles, &c., of which the following is a specification, reference being had to the accompanying drawings, forming a part hereof.

This invention relates particularly to that part of the steering mechanism of motor-vehicles, &c., which is carried by the body of the vehicle and is directly manipulated by the driver or operator. It is necessary that the steering post or pillar, which rises from the floor of the vehicle-body, shall be placed within easy reach of the driver, and it is also desirable that it shall be capable of movement toward or away from the vehicle-seat, both for the convenience of the driver and to facilitate the movement of persons into and from the vehicle. At the same time the operative relation of the steering post or pillar to the other parts of the steering mechanism should not be affected by the movements of the steering post or pillar, and the leverage of the steering wheel or handle should remain always the same.

It is the object of this invention to meet all of these requirements and in addition thereto provide means whereby the steering post or pillar, together with the bracket which forms a support or brace therefor, may be swung or rotated out of the way of the occupants of the vehicle when desired, and to that end the steering post or pillar is not only rotatable about its own axis to control the steering-wheels, but is arranged to rotate or swing upon a transverse axis.

The invention is more fully described hereinafter with reference to the accompanying drawings, in which, for purposes of explanation, it is represented as embodied in a convenient and practical form.

In the drawings, Figure 1 is a side elevation of the steering mechanism, the body of the vehicle and the wheels being indicated by dotted lines. Fig. 2 is a plan view, on a larger scale, of a portion of the mechanism shown in Fig. 1, the steering post or pillar being shown in section. Fig. 3 is a detail section on the plane indicated by the line 3 3 of Fig. 2, with parts in elevation.

In the embodiment of the invention represented in the drawings the steering wheel or handle A is mounted upon a shaft B, which carries at its lower end a skew-gear C. The latter meshes with a corresponding gear D on a short transverse shaft D', which is mounted in suitable bearings on the body of the vehicle and substantially in the plane of the footboard and has an arm $d$, connected by a link E to the devices by which movement is transmitted to the steering-wheels. The precise form of the gearing and of the transmission devices to the steering-wheels is immaterial so far as the present invention is concerned, and any usual or suitable arrangement thereof may be employed. The shaft B has its bearing in a bracket F, which is swiveled upon the shaft D' or upon bearings concentric therewith, forming a bearing and brace for said shaft, so that the movement of said bracket shall be concentric with the gear D, whereby the gear C remains always in mesh with the gear D and operative connection between the steering post or pillar and the other parts of the steering mechanism is always maintained whether the post or pillar be swung back toward the seat of the vehicle, as shown in full lines in Fig. 1, or swung away from the same, as shown in dotted lines, and in all positions the leverage of the steering wheel or handle remains the same. The bracket F is arranged to be engaged by a latch $f$ to retain the steering post or pillar in the most convenient position for operation, such latch being formed and disposed as may be most convenient.

The invention, as will be readily understood, is capable of embodiment in other forms, as the character of the vehicle or other considerations may determine, and is not to be limited to the precise construction and arrangement shown and described herein.

I claim as my invention—

1. In a motor-vehicle, the combination of a steering-pillar rotatable about its axis, a bearing for said pillar pivoted upon the vehicle, an arm operatively connected with the steering mechanism and pivotally mounted upon the vehicle, a gear fixed to said steering-pillar and a gear fixed to said arm to coöperate with the first-named gear, substantially as shown and described.

2. In a motor-vehicle, the combination of a steering-pillar rotatable about its axis, a bearing for said pillar pivoted upon the vehicle, an arm operatively connected with the steering mechanism and pivotally mounted upon the vehicle, a gear fixed to said steering-pillar, and a gear fixed to said arm concentric with the pivot of the arm and the pivot of said bearing to coöperate with the first-named gear, substantially as shown and described.

3. In a motor-vehicle, the combination of a steering-pillar rotatable about its axis, a bearing for said pillar pivoted upon the vehicle, an arm operatively connected with the steering mechanism and pivotally mounted upon the vehicle, and coöperating members upon said pillar and said arm respectively, whereby the rotation of the pillar effects movement of the arm in any position of the pillar about the axis of its bearing, substantially as shown and described.

4. The combination of a steering post or pillar rotatable about its axis to steer the vehicle, a gear carried by said post or pillar, a second gear supported by the floor of the vehicle and operatively connected with the steering mechanism and in mesh with the first-named gear, and a support for the steering post or pillar mounted to swing about the axis of the last-named gear, substantially as shown and described.

5. The combination of a steering post or pillar rotatable about its axis to steer the vehicle, a gear carried by said post or pillar, a second gear supported by the floor of the vehicle in mesh with the first-named gear and operatively connected with the steering mechanism, a support for the steering post or pillar mounted to swing about the axis of the last-named gear, and a latch to engage said support, substantially as shown and described.

This specification signed and witnessed this 17th day of October, A. D. 1899.

HIRAM PERCY MAXIM.

In presence of—
MAUD L. CLARK,
HERMANN F. CUNTZ.